May 28, 1935. J. F. DUBY 2,003,178
VEHICLE STEERING ARM GAUGE
Filed Feb. 23, 1932
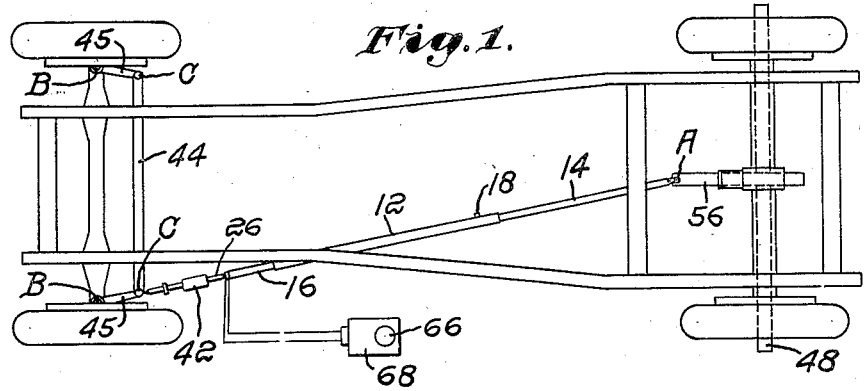
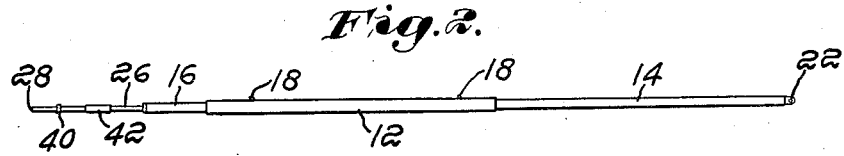
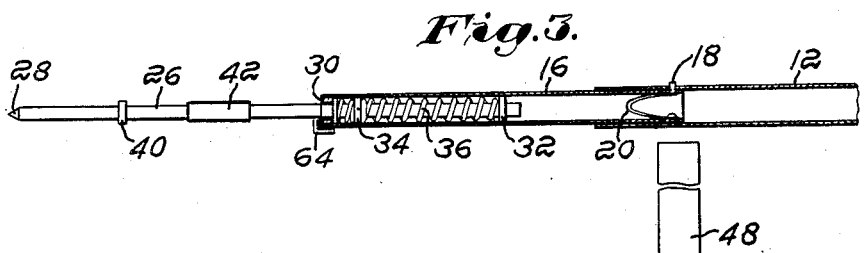
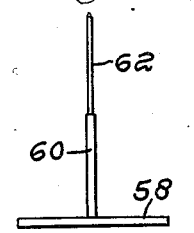
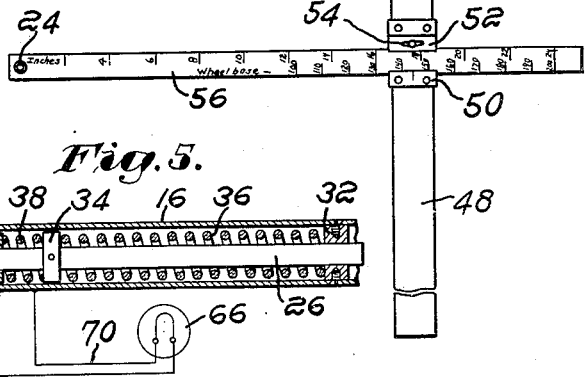
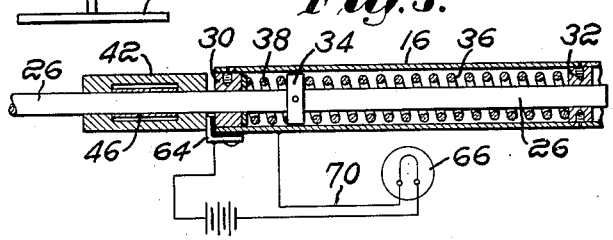
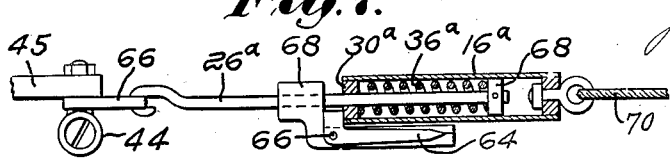
INVENTOR.
John F. Duby Patented May 28, 1935

2,003,178

UNITED STATES PATENT OFFICE 2,003,178

VEHICLE STEERING ARM GAUGE

John Fabien Duby, Boston, Mass.

Application February 23, 1932, Serial No. 594,514

13 Claims. (Cl. 33—203)

This invention relates to apparatus for and the method of testing the angular relation of vehicle steering arms with respect to the wheel spindle or any given part of the vehicle framework; for example, a predetermined point near the rear axle of an automobile when such a point is designated by the manufacturer and to establish such a point when no such recommendations are available. This point preferably lies on the longitudinal center-line of the vehicle and is generally designated by manufacturers to bring about a variation of the axial angles of the front wheels, when the latter are turned from straight ahead position, in order to maintain correct alinement.

A bent or misalined steering arm obviously disturbs the correct alinement of the front wheels particularly on curves, hence the purpose of a test to discover a bend in the steering arm usually caused by a severe blow or wrenching of the front wheels by coming in contact with road ruts or curbings.

For correct steering arm alinement there are three particular points, or centers, which are of vital importance; first, the point near the rear axle, referred to above, which may be designated as A; second, a point B representing the axis of the king pin upon which the spindle is mounted to turn; third a point C which represents the axis of a stud connecting the steering arm to the usual tie-rod.

Correct alinement of the steering arms will indicate the three points A, B and C lying in a substantially straight line when the wheels are in a straight ahead position; therefore a test which shows point C a measured distance either side of a straight line, between points A and B, will indicate the amount of bend in the arm as well as the direction in which it is bent. The test can be made with the wheels in a straight ahead position but I prefer to line up the points A, B and C first, subsequently checking the wheels for straight ahead position as will be presently described. The straight line position of the points A, B, and C, which represents the straight ahead position of the wheels, does not represent the mid-position of point C in its arc of normal travel about the axis B. The reason for this condition is obvious to those skilled in the art.

One of the objects of my invention is to provide apparatus whereby a workman may be able to determine when the points, above referred to, are in a straight line. Another object is to provide means to quickly and accurately locate the point A as a factor to a subsequent test.

Other objects and advantages will be apparent from the following description taken in connection with the accompanying drawing and claims.

In the drawing:

Figure 1 is a diagrammatic representation of a vehicle frame showing my improved apparatus in position to make a test.

Fig. 2 is a view, in elevation, of one portion of the apparatus.

Fig. 3 is an enlarged view, partly in section, of one end of the portion shown in Fig. 2.

Fig. 4 is a plan view of another portion of the apparatus adapted to locate the point A.

Fig. 5 is an enlarged longitudinal section, illustrating more fully parts shown in Fig. 3 and including the electrical circuit.

Fig. 6 is a side view of a pedestal involved in a test and

Fig. 7 represents a modified form of apparatus.

A portion of the apparatus shown in Fig. 2 comprises a telescoping body made up preferably of a tubular main section 12, a rod 14, adapted for engagement with the former and another tubular section 16 also adapted for engagement with the section 12. The operative positioning of parts 12, 14 and 16 may be maintained by means of detent members 18, one of which is shown in Fig. 3. A spring 20 serves to maintain connections between each detent and an aperture in section 12. It will be obvious that a plurality of apertures may be employed to vary the overall length of this portion of the apparatus. The rod 14 is provided, at its outer end, with an eye 22 adapted to form a connection with stud 24 on that part of the apparatus shown in Fig. 4 and to be described later.

Mounted within the outer end of section 16 is a yieldably mounted shaft 26 provided at its outer end with a pointed portion 28. This shaft may be supported within the section by bearings 30 and 32 which are fixed therein by screws as shown in Fig. 5. A collar 34 is fixed to the shaft 26 near the bearing 30. A coil spring 36 is interposed between the bearing 32 and collar 34 normally urging the shaft outwardly against a short cushion spring 38 disposed between bearing 30 and collar 34 thereby limiting the outward movement of the shaft with a cushioning effect. Inward movement of the shaft is permitted by compressing spring 36.

Near the outer end of shaft 26 is a collar 40 fixed thereto and adapted to provide an abutment against which a slidable sleeve 42 may be manually operated to depress the pointed end 28 into contact with the usual tie-rod 44 at the point where it is pivotally connected to the steering arms 45, or it may contact directly with said steering arm. The sleeve is also utilized as a circuit breaker, in connection with a light signal system, to be described later and may be provided at its bore with a friction spring member 46 to prevent slipping and to insure electrical contact.

That portion of the apparatus shown in Fig. 4 has to do with locating the point A referred to above and comprises a thin flat member 48 adapted to be held in testing position by the rear wheels of a vehicle resting thereon, and should be positioned directly beneath the rear axle and parallel therewith, as shown in Fig. 1. A guide block 50 is fixed to member 48 substantially midway of its ends and cooperates with a clamping plate 52 and thumb nut 54 to support a crossbar 56 extending longitudinally of the vehicle. Scale marks at one edge of the cross-bar may indicate inches and marks on the opposite edge may designate settings for various vehicle wheel bases. A fixed pointer mark on the block 50 is utilized, in conjunction with the scale marks, to indicate the position of stud 24 relative to the rear axle.

Fig. 6 represents one form of a pedestal to be used in connection with the apparatus and comprises a base 58 having an upstanding portion 60. A vertically slidable gauge rod 62 may be frictionally engaged within the portion 60 in any suitable manner.

My improved apparatus may be operated as follows:

If the specifications of a car to be tested call for the point A, represented by stud 24, to be located eight inches forward of the rear axle, the operator slides the bar 56 to a position where the mark eight is in line with the pointer mark on block 50 and clamps it in that position. In the absence of a specified distance, he ascertains the car wheel base and sets bar 56 accordingly by the marks adjacent the block. That portion of the apparatus is then placed on the floor and the car driven onto it to a position shown in Fig. 1, the longitudinal center line being obtained by measuring and equalizing the extending ends of member 48 outside the rear wheels. The front wheels are then raised from the floor in any desired manner.

The eye 22 in the end of rod 14 is then connected onto stud 24 and by means of the detents 18 the distance from said stud to shaft point 28 is made to be slightly greater than the distance from the stud to the point of connection between the tie rod and steering arm above referred to as point C. The shaft 26 is then manually forced against the spring 36 and the pointed end 28 placed in contact with the tie rod 44 in line with the vertical axis of point C. The sleeve 42 is then used as a hammer against the collar 40 to depress end 28 into substantial contact with the tie rod 44; the spring 36 permits movement of shaft 26 for this purpose without disturbing previous adjustments.

The next operation is to turn the front wheels any slight distance to one side. The sleeve 42 is then slid along shaft 26 and brought into contact with a terminal plate 64, Fig. 5, said plate being attached to section 16 but insulated therefrom. A lamp 66 and a battery therefor are contained in a case 68, Fig. 1, and the electrical circuit involved is shown in Fig. 5. It should be noted that the case 68 may be placed on the running board or any suitable spot where it will be visible to the operator while manipulating the steering wheel.

A complete circuit has now been established through line 70, shaft 26, sleeve 42 and plate 64 thereby causing the lamp to light. The next step consists of turning the wheels slowly in the opposite direction which will gradually shorten the distance between points A and C until the latter point is in line with A and B. During this movement shaft 26 has receded into section 16 against spring 36 and slides through sleeve 42 which remains in contact with plate 64. With the three points now in a straight line, shaft 26 has reached the limit of its inward travel and further movement of the wheels in the same direction will cause the shaft to move outward as the distance between A and C begins to lengthen. Sleeve 42 will then move with the shaft and immediately break contact with plate 64 thereby extinguishing the lamp.

The wheels are then turned slowly in the opposite direction and as the three points again come into line the sleeve 42 will again contact with plate 64 and light the lamp. This operation may be repeated until the operator is able to feel a position midway between where the lamp is lighted and extinguished or, if desired, he may measure the turning movement of the wheels while the lamp is lighted and then set the wheels midway of such movement to bring the points A, B and C into exact alinement. The wheels should then be in a straight ahead position, if not, it will indicate a bent steering arm.

In order to determine the amount and direction of the bend, the operator may then place the gauge rod 62, (of the pedestal shown in Fig. 6), directly beneath point C, turn the wheels to correct straight ahead position and subsequently note and measure the distance which point C has moved away from rod 62 and thereby obtain the desired information. The foregoing operation may then be applied to the opposite steering arm in the same manner as just described.

It will be clear that my improved apparatus may be operated conversely to the foregoing operation for determining the location of point A when the wheels are in a straight ahead position. Assuming angular relationship between the wheels and arms 44 to be correct, the former may be manipulated, as in the previous test, to determine the straight line position of points A, B and C. Point A would be determined by loosening nut 54 and moving bar 56 forward or back until the three points were in line when the wheels were in straight ahead position. The position of the pointer mark on block 50 with respect to the nearest scale mark on bar 56 would indicate the distance between the rear axle and stud 24. The operator may also check the wheelbase mark with the actual wheel-base of the vehicle being tested.

In Fig. 7 I have illustrated a modified form of one portion of the apparatus wherein the alinement of points A, B and C may be indicated by a pointer 64 pivoted at 66 to the extended portion of a slidable sleeve 68, the general construction and operation of which is similar to sleeve 42 already described. The shaft 26a in this case is provided with a hooked end adapted to be engaged with a strap 66 which may encircle the usual ball-joint at the outer end of a steering arm. A spring 36a is interposed between the end shaft bearing 30a and a collar which is fixed to the shaft. The cylinder 16a is provided at one end with a cable or chain 70 the opposite end of which may be adapted for connection with stud 24, previously described.

The operation of the foregoing is as follows:

First engage the hooked end of shaft 26ª with strap 66 and then take up on the cable at stud 24 until spring 36ª is compressed slightly. Next, with the wheels turned to one side, push sleeve 66 along the shaft toward cylinder 16ª until the short end of pointer 64 is pinched between the sleeve and the adjacent cylinder end. Manipulation of the steering wheel, as in the previous case, will cause movement of pointer 64 except when points A, B and C are in line.

It is to be understood that the forms of my invention herein shown and described are to be taken as preferred embodiments of the same and that various changes and arrangements of parts may be resorted to without departing from the spirit of the invention or the scope of the accompanying claims.

I claim:—

1. Testing apparatus comprising an element adapted to establish a predetermined point relative to a vehicle chassis, a yieldable unit adapted to be interposed between said element and a vehicle steering arm part, connecting means between said unit and steering-arm including a pointed rod and associated hammer member, and indicating means associated with said unit to indicate when a point on the steering arm arc of travel lies in a straight line between the axis of said arc and the predetermined point.

2. Testing apparatus comprising, an element adapted to establish an objective point relative to a vehicle chassis, pivotal connecting means carried by said element, a gauging unit adapted to be connected to said pivotal means and also arranged for pivotal connection to a vehicle steering-arm, said unit being operable by manipulation of the steering mechanism, and means operable by said gauging unit to indicate when the last mentioned pivotal connection lies in a straight line between said objective point and the associated king-pin axis.

3. Testing apparatus comprising, an element arranged to be placed in contact with a vehicle part, a member having a portion adapted for pivotal connection to a gauging unit and adjustably associated with said element whereby the pivotal portion of said member may be positioned substantially on the longitudinal median of the vehicle and adjusted to that particular location towards which each steering-arm should project when the associated wheels are in straight-ahead position, and a gauging unit associated with said member pivotally connected to said portion and to a steering-arm part operable to show whether or not a steering-arm does project towards said location.

4. Testing apparatus comprising, an element to be positioned by contact with a vehicle part, pivoting means adjustably associated with said element, and means pivotally connected to said element and to a steering-arm part adapted to establish two objective points each of which are equidistant from a straight line drawn between said pivotal connection and a point on the king-pin axis.

5. Testing apparatus comprising, an element adapted to establish a predetermined point relative to a vehicle chassis, a yieldable unit adapted to be interposed between said element and a vehicle steering mechanism part, connecting means between said unit and steering mechanism part including a pointed rod and an associated hammer member.

6. An element adapted to be positioned at a desired point with respect to the pivotal point of an oscillatable arm, an elongated and longitudinally yieldable gauging unit, means associated with one end of said unit to provide for pivotal engagement thereof with the element, means associated with the other end of said unit adapted for pivotal connection adjacent the outer end of an oscillatable arm whereby said unit and the oscillatable arm form a toggle-like connection between the fixed element and the axis of the oscillatable arm, and means operable by the oscillatory movement of the arm to indicate when the three points of the toggle arrangement lie in a straight line.

7. The method of correcting misaligned steering mechanism consisting of, providing an element adapted to establish an objective point relative to the vehicle chassis towards which a spindle arm should project, interposing a gauging element between said objective point and a spindle-arm part, manipulating the steering mechanism to operate the gauging element, determining the position of an associated dirigible wheel when a given point on the steering arm is nearest to said objective point, and adjusting the angle between the arm and its associated wheel-spindle to bring the wheel into correct straight-ahead position.

8. The method of correcting misaligned steering mechanism consisting of, providing an element adapted to make pivotal connection with a gauging member, interposing a gauging member between the element and a spindle-arm part, manipulating the steering mechanism to operate the gauging member meanwhile moving the element to the position towards which the spindle arm points when the wheels are in a straight ahead position, establishing an objective point relative to the vehicle chassis towards which the spindle-arm should project, and adjusting the angle between the arm and its associated wheel-spindle to cause the arm to project towards the objective point when the wheels are in a straight ahead position.

9. Apparatus comprising adjustable means including an element adapted to be positioned at a certain point on the longitudinal median of a vehicle, an elongated and longitudinally yieldable unit to be connected to said element at said point and also to a steering arm part, and indicating means operable at a predetermined degree of extension of said unit upon swinging movement of the steering arm part, whereby the angular relationship between the steering arm and its associated wheel spindle may be tested.

10. Apparatus comprising an elongated and longitudinally yieldable unit adapted to be pivotally connected to a steering arm part, an element adapted to be associated with said unit and pivotally connected at the opposite end of the unit from the steering arm, and indicating means associated with the unit and adapted to indicate when the axis of the king pin, the steering arm connection to a tie rod, and the element, are in a straight line.

11. Apparatus comprising means to establish an objective point on the longitudinal median of a vehicle, an elongated and longitudinally yieldable unit adapted to be pivotally connected to said means at said point and also to a steering arm part, and electrical signal means associated with, and adapted to be operable by said yieldable unit during manipulation of the vehicle steering wheel.

12. Testing apparatus comprising an elongated and longitudinally yieldable gauging unit, means pivotally connecting one end of the unit to a steering arm part, means to position the opposite end of the unit at a predetermined pivotal point, and indicating means associated with the gauging unit to show when a steering arm part lies between the predetermined pivotal point and the axis of the king pin of the steering arm part to which the gauging means is pivotally connected.

13. Apparatus comprising a member adapted to be set in a desired position with respect to the pivotal point of an oscillatable arm, an elongated and longitudinally yieldable gauging unit adapted to be pivotally interconnected between the unit and a point on the arm, said unit being longitudinally yieldable and operable by oscillation of the arm about its axis, and indicating means associated with said gauging unit to indicate when the axis of the arm, the point on the arm where the gauging unit is pivotally connected, and the first mentioned member are in a straight line.

JOHN FABIEN DUBY.